(12) United States Patent
Tokish et al.

(10) Patent No.: US 10,576,975 B2
(45) Date of Patent: Mar. 3, 2020

(54) ACTIVE REAR SENSE AREA ADJUSTMENT OF COLLISION AVOIDANCE SYSTEM OF A VEHICLE WHEN VEHICLE IS APPROACHING A POSITIVE ROAD GRADE CHANGE

(71) Applicants: Stephen Tokish, Sylvania, OH (US); Nicholas N Church, Canton, MI (US)

(72) Inventors: Stephen Tokish, Sylvania, OH (US); Nicholas N Church, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 107 days.

(21) Appl. No.: 15/845,028

(22) Filed: Dec. 18, 2017

(65) Prior Publication Data

US 2019/0184985 A1 Jun. 20, 2019

(51) Int. Cl.
*B60W 30/095* (2012.01)
*B60W 40/076* (2012.01)
*B60W 30/18* (2012.01)

(52) U.S. Cl.
CPC .. *B60W 30/0956* (2013.01); *B60W 30/18036* (2013.01); *B60W 40/076* (2013.01); *B60W 2422/00* (2013.01); *B60W 2550/10* (2013.01)

(58) Field of Classification Search
USPC ........................................................ 701/301
See application file for complete search history.

(56) References Cited

U.S. PATENT DOCUMENTS

| 2002/0077902 | A1  | 6/2002  | Marcus |
|---|---|---|---|
| 2010/0020170 | A1* | 1/2010  | Higgins-Luthman ........................ B60Q 1/1423 348/135 |
| 2014/0247351 | A1* | 9/2014  | Murillo Amaya ........................ G06K 9/00825 348/148 |
| 2014/0309806 | A1* | 10/2014 | Ricci ........................ B60Q 1/00 701/1 |
| 2016/0096514 | A1* | 4/2016  | Miller ........................ B60T 7/22 701/70 |

FOREIGN PATENT DOCUMENTS

WO WO-2010099416 A1 9/2010

* cited by examiner

*Primary Examiner* — Tyler D Paige
(74) *Attorney, Agent, or Firm* — Ralph E. Smith

(57) ABSTRACT

In an aspect, false alerts in a collision avoidance system of an automotive vehicle are prevented when the vehicle is in reverse. The collision avoidance system includes at least an upper rear facing obstruction sensor and a lower rear facing obstruction sensor. When the vehicle is approaching a positive road grade change, the sensitivity of the lower rear facing obstruction sensor is reduced. In an aspect, an active rear view area of a rear facing vision system of the vehicle is adjusted when the vehicle is approaching a change in road grade.

8 Claims, 3 Drawing Sheets

| ROAD ANGLE (DEGREES) | ROAD GRADE | UPPER SENSOR SENSITIVITY (%) | LOWER SENSOR SENSITIVITY (%) |
|---|---|---|---|
| 0 | 0 | 1 | 1 |
| 1 | 1.75 | 1 | 0.9825 |
| 2 | 3.49 | 1 | 0.9651 |
| 3 | 5.24 | 1 | 0.9476 |
| 4 | 6.99 | 1 | 0.9301 |
| 5 | 8.75 | 1 | 0.9125 |
| 6 | 10.51 | 1 | 0.8949 |
| 7 | 12.28 | 1 | 0.8772 |
| 8 | 14.05 | 1 | 0.8595 |
| 9 | 15.84 | 1 | 0.8416 |
| 10 | 17.63 | 1 | 0.8237 |
| 11 | 19.44 | 1 | 0.8056 |
| 12 | 21.26 | 1 | 0.7874 |
| 13 | 23.09 | 1 | 0.7691 |
| 14 | 24.93 | 1 | 0.7507 |
| 15 | 26.79 | 1 | 0.7321 |
| 20 | 36.4 | 1 | 0.636 |
| 25 | 46.63 | 1 | 0.5337 |
| 30 | 57.73 | 1 | 0.4227 |
| 35 | 70.02 | 1 | 0.2998 |
| 40 | 83.91 | 1 | 0.1609 |
| 45 | 100 | 1 | 0 |

FIG 3

ACTIVE REAR SENSE AREA ADJUSTMENT OF COLLISION AVOIDANCE SYSTEM OF A VEHICLE WHEN VEHICLE IS APPROACHING A POSITIVE ROAD GRADE CHANGE

FIELD

The present invention relates to adjusting an active rear sense area of a collision avoidance system of a vehicle and corresponding adjustment of active area of a rear facing vision system when the vehicle is in reverse and approaching a positive road grade change.

BACKGROUND

Many automotive vehicles have displays that display video, such as screens of infotainment units. Many automotive vehicles also have back-up cameras that view an area behind the vehicle which can then be displayed on the display in the vehicle when desirable. Typically, this occurs when the vehicle is in reverse. Many automotive vehicles also have obstruction sensors, such as LIDAR sensors associated with one or more sides of the vehicle (such as front, back, right, left, front right, back right, front left and back left sides) of the vehicle, that sense how far that particular side of the vehicle is from an object. These sensors are typically part of advanced driver assistance systems, commonly known as ADAS. In vehicles having obstruction sensors, when the side of the vehicle with which one of the obstruction sensors is associated approaches within a predetermined distance of the object, an alert is given to the driver of the vehicle, such as an audible alert, a visual alert, or both. The visual alert may be a graphic displayed on the display of the vehicle, such as a yellow or red line, the illumination of a discrete visual indicator such as a LED, or both. Moreover, in some vehicles, multiple alerts are given, such as a "yellow" alert when the side of the vehicle comes within a first predetermined distance of the object and a "red" alert when the vehicle comes within a second, closer predetermined distance of the object. In some cases, the obstruction sensors include rear facing obstruction sensors that sense objects behind a vehicle in an active rear sense area. As used herein, the active rear sense area is the area behind the vehicle in which the rear facing obstruction sensor can detect an object. A rear facing obstruction sensor is typically active when the vehicle is in reverse. As the vehicle moves in reverse, an alert is given if the rear facing obstruction sensor senses that the rear of the vehicle has approached too close to an object in the active rear sense area.

As discussed, in vehicles having back-up cameras, the area behind the vehicle is displayed on a display in the vehicle when the vehicle is in reverse. The back-up camera has an active rear view area which as used herein, is an area behind the vehicle that the back-up camera "sees."

As used herein, the current road grade is the grade of the road that the vehicle is currently on and is an angle with respect to horizontal, which can be positive, negative or zero. A positive angle is when the road grade inclines upwardly with respect to the direction that the vehicle is traveling in reverse, a negative angle is when the road grade inclines downwardly with respect to the direction the vehicle is traveling in reverse, and a zero angle is when the road grade is flat. Since the rear facing obstruction sensor (or sensors) and the back-up camera are typically affixed to the vehicle, the active rear sense area and the active rear view area will change when the vehicle is approaching a change in road grade. When the change in road grade is a positive road grade change, this can trigger false obstruction alerts due to the active rear sense area changing relative to the current road grade, as discussed in more detail below. A positive road grade change is when the angle between the current road grade and the approaching road grade is positive and the approaching road grade is more upward with respect to the current road grade. This includes, without limitation: (i) when the current road grade is inclined downwardly, the approaching road grade is also inclined downwardly but at a lesser incline, the approaching road grade is flat, or the approaching road grade is inclined upwardly; (ii) when the current road grade is flat, the approaching road grade is inclined upwardly; (iii) when the current road grade is inclined upwardly, the approaching road grade is also inclined upwardly but at a greater incline.

The change in the active sense area when the vehicle is approaching a positive road grade change can result in false alarms that the rear of the vehicle is too close to an object. For example, the change in the active rear view sense area when the vehicle is approaching the positive road grade change can result in an object such as a tuft grass being in the active rear sense area resulting in an alert. If the approaching road grade was even relative to the current road grade or angles downwardly with respect to the current road grade (i.e., the change in road grade is a negative road grade change), the tuft of grass would be below the active rear sense area and thus not detected by the rear facing obstruction sensor.

SUMMARY

In accordance with an aspect of the present disclosure, false alerts in a collision avoidance system of an automotive vehicle are prevented when the vehicle is in reverse and approaching a positive road grade change. The collision avoidance system includes at least an upper rear facing obstruction sensor and a lower rear facing obstruction sensor. When the vehicle is in reverse and approaching a positive road grade change, the sensitivity of the lower rear facing obstruction sensor is reduced.

In an aspect, when the sensitivity of the lower rear facing obstruction sensor is reduced, it is reduced by an amount based upon a magnitude of the positive road grade change.

In an aspect, when a vehicle is in reverse and approaching a change in road grade, an active rear view area of a rear facing vision system of the vehicle is adjusted based upon a magnitude of the road grade change. In an aspect, when the vehicle is traveling downhill in reverse, the active rear view area is adjusted by $RCAA=(\alpha-\beta)/\alpha$ where RCAA is the rear active viewing area, $\alpha$ is the angle from a vision sensor of the rear facing vision system to ground and $\beta$ is an angle that is a difference in the angle of incline of the current road grade and the angle of incline of the approaching road grade where $\beta$ is greater than or equal to zero, and when the vehicle is traveling in reverse on a flat road or uphill on an inclined road, the rear active viewing area is adjusted by $RCAA=(\alpha+\beta)/\alpha$ where $\beta$ is less than zero.

BRIEF DESCRIPTION OF THE DRAWINGS

The present invention will become more fully understood from the detailed description and the accompanying drawings, wherein:

FIG. 3 is a table showing adjustment of the sensitivity of a lower rear obstruction sensor based on different magnitudes of a positive road grade change.

DETAILED DESCRIPTION

Figure 1:
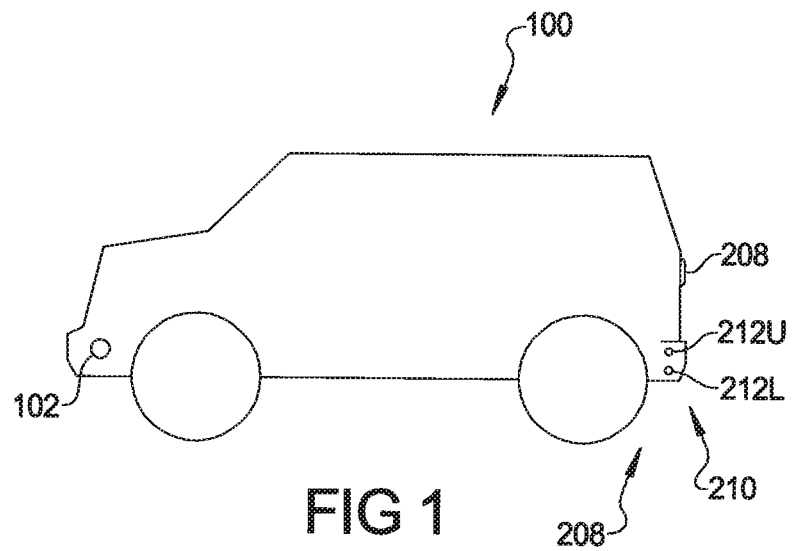
FIG. 1 is a simplified diagrammatic view of a vehicle having a collision avoidance system in accordance with an aspect of the present disclosure.

The following description of the preferred embodiment(s) is merely exemplary in nature and is in no way intended to limit the invention, its application, or uses. Corresponding reference numerals indicate corresponding parts throughout the several views of the drawings.

FIG. 1 is a simplified diagrammatic view of a vehicle 100 having a collision avoidance system 200 in which an active rear sense area is adjusted due to vehicle 100 approaching a positive road grade change in accordance with an aspect of the present disclosure. In an aspect, an active rear view area is also adjusted when the vehicle is approaching a road grade change. In this regard, a vehicle is determined to be approaching a road grade change when it is a predetermined distance from the road grade change that is close enough to the road grade change that above discussed false obstructions alerts may occur if the active rear sense area is not adjusted. In an aspect, this predetermined distance is a calibratable distance determined heuristically or theoretically and entered into ECU 202.

System 200 includes an electronic control unit ("ECU") 202, a display 204, a rear facing vision system 206 having one or more vision sensors that are collectively referred to herein as vision sensor 208 and a rear facing obstruction sensor pack 210. Rear facing obstruction sensor pack 210 includes a plurality of rear facing obstruction sensors 212 oriented in vertical relation to each other. The field of vision of rear facing vision system 206 is an area behind the vehicle and the area that the rear facing vision system "sees" is the active rear view area. In an aspect, vision sensor 208 is a video camera.

In an aspect, ECU 202 is an ECU of vehicle 100, such as a body controller. In an aspect, ECU is a separate ECU mounted in vehicle 100. The display 204 for example is a known type display of a radio head unit mounted for example in a center of the instrument panel of the vehicle. Display 204 is also a known type of display such as those currently used for displays of certain radio head units. Rear facing vision system 206 is a known type of vision system and each rear facing obstruction sensor 212 is a known type of obstruction sensor. Display 204, rear facing vision system 206 and rear facing obstruction sensors 212 are coupled to ECU 202.

Vision sensor 208 is installed at a rear of vehicle 100. Rear facing obstruction sensor pack 210 is also installed at the rear of vehicle 100. The rear facing obstruction sensors 212 include at least an upper obstruction sensor 212U and a lower obstruction sensor 212L.

In accordance with an aspect of the present disclosure, when vehicle 100 is in reverse and approaching a positive road grade change, the sensitivity of the lower obstruction sensor 212L is reduced. Readings from upper and lower obstruction sensors 212U and 212L are used by ECU 202 to determine whether the vehicle when traveling in reverse is approaching a positive road grade change. More specifically, when the vehicle is traveling in reverse and approaching the positive road grade change, lower obstruction sensor 212L will "see" the approaching road grade sooner than the upper obstruction sensor 212U compared to when the upper and lower obstruction sensors 212U and 212L see an unchanged road grade and this difference is used in determining that the vehicle is approaching a positive road grade change. When it is determined, such as by ECU 202, that the vehicle traveling in reverse is approaching a positive road grade change, the sensitivity of the lower obstruction sensor 212L is reduced, such as by ECU 202, according to a magnitude of the positive road grade change. That is, the greater the magnitude of the positive road grade change, the more that the sensitivity of lower obstruction sensor 212L is reduced. As such, objects must be closer to lower obstruction sensor 212L for lower obstruction sensor to sense them than is the case when lower obstruction sensor 212L has higher sensitivity and this reduces the possibility of false obstruction alerts from objects further away from lower obstruction sensor 212L. FIG. 3 is a table showing an example of the reduction in sensitivity of lower obstruction sensor 212L according to different magnitudes of the positive road grade change.

In an aspect, the rear active viewing area of rear facing vision system 206 is also adjusted based on the vehicle, when traveling in reverse, approaching a change in road grade and the rear active viewing area is adjusted based on a magnitude of the change in road grade. When vehicle 100 is in reverse and traveling downhill, the rear active viewing area is adjusted by $RCAA=(\alpha-\beta)/\alpha$ where RCAA is the rear active viewing area, $\alpha$ is the angle from vision sensor 208 to ground and $\beta$ is an angle that is a difference between an angle of the current road grade with respect to horizontal and an angle of the approaching road grade with respect to horizontal, and is greater than or equal to zero. When vehicle 100 is in reverse and traveling downhill on the inclined road, the rear active viewing area is adjusted by $RCAA=(\alpha+\beta)/\alpha$.

Figure 2:
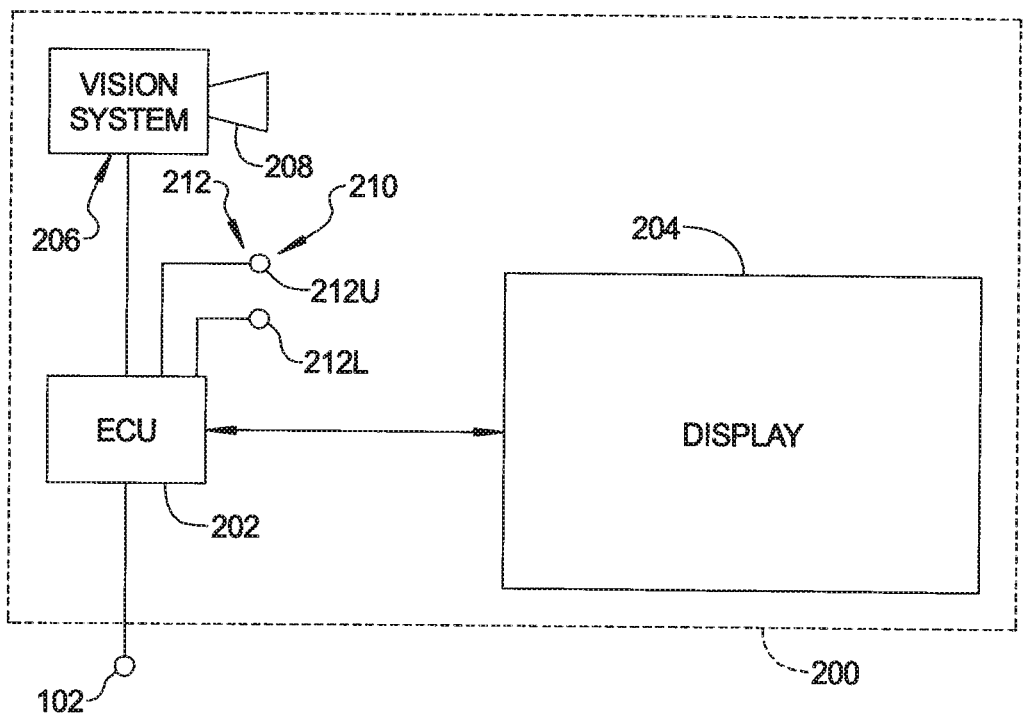
FIG. 2 is a basic block diagram showing the display, rear facing vision system and rear obstruction sensors of FIG. 1.
Figure 4:
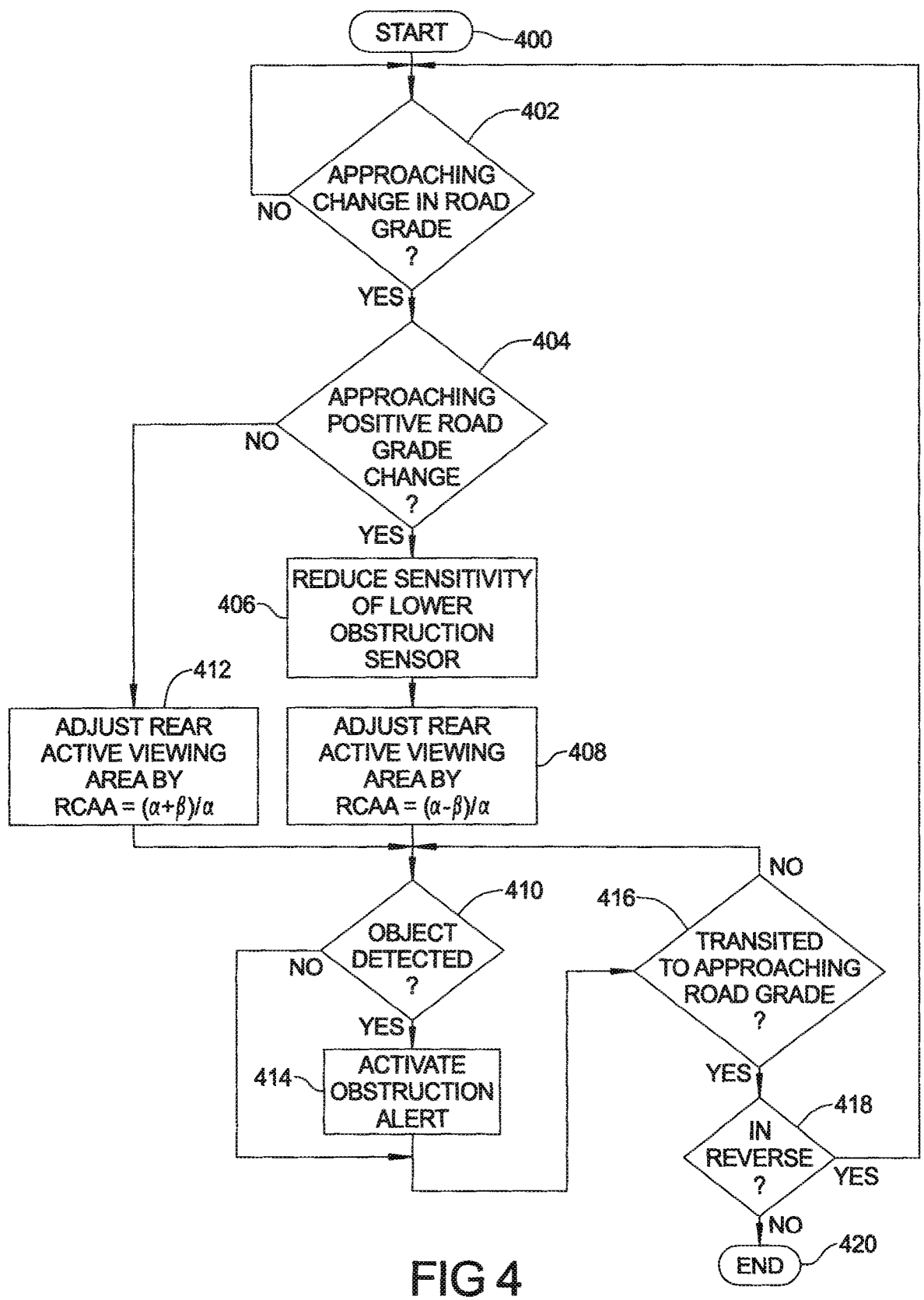
FIG. 4 is a flow chart of a method for adjusting an active rear sense area and an active rear view area in accordance with an aspect of the present disclosure.

FIG. 4 is a flow chart of control logic of a control routine for the above described adjustment method. The control routine starts at 400 and proceeds to 402. Illustratively, the control routine executes when vehicle 100 is traveling in reverse. At 402, the control routine checks whether the vehicle is approaching a change in road grade and if it is, proceeds to 404. If the vehicle is not approaching a change in road grade, the control routine branches to 410. At 404, the control routine checks whether the change in road grade will be a positive road grade change. In an aspect, vehicle 100 includes a sensor 102 (FIG. 1) that senses the current road grade, such as an inclinometer or accelerometer. In an aspect, sensor 102 is coupled to ECU 202 (FIG. 2) or is coupled to a separate ECU (not shown) of vehicle 100 that communicates with ECU 202.

If the change in road grade is a positive road grade change, the control routine proceeds to 406 where reduces the sensitivity of the lower obstruction sensor 212L and then proceeds to 408 where it adjusts the rear active view area by $RCAA=(\alpha-\beta)/\alpha$ where $\beta$ is greater than or equal to zero. The control routine then proceeds to 410.

If at 404 the change in road grade is not a positive road grade change, the control routine proceeds to 412 where it adjusts the rear active view area by $RCAA=(\alpha-\beta)/\alpha$ where $\beta$ is less than zero. The control routine then proceeds to 410.

At 410, the control routine checks whether an object was detected by any of the rear facing obstruction sensors 212 in rear facing obstruction sensor pack 210. If so, the control routine proceeds to 414 whether it activates an obstruction alert, such as by displaying a graphic on display 204, sounding an audible alert, or both. The control routine then proceeds to 416. If at 410 an object was not detected, the control routine proceeds to 416.

At 416, the control routine checks whether the vehicle has transited to the approaching road grade. If not, the control routine branches back to 410. If the vehicle has transited to the approaching road grade, the control routine proceeds to 418 where it checks whether the vehicle is still in reverse, which in an aspect it does by checking whether the shift selector of vehicle 100 has been moved out of the reverse position. If the vehicle is still in reverse, the control routine branches back to 402. If the vehicle is no longer in reverse, the control routine ends at 420.

ECU 202 in which the above described methods are implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that system 200 performs a function or is configured to perform a function, it should be understood that ECU 202 is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of preventing false alerts in a collision avoidance system of an automotive vehicle when the vehicle is in reverse, the collision avoidance system having at least an upper rear facing obstruction sensor, a lower rear facing obstruction sensor, and an electronic control unit, the method comprising:
having the electronic control unit reduce a sensitivity to an object of the lower rear facing obstruction sensor when the vehicle is approaching a positive road grade change to reduce a distance at which the lower rear facing obstruction sensor senses the object.

2. The method of claim 1 wherein reducing the sensitivity of the lower rear facing obstruction sensor includes reducing its sensitivity by an amount based upon a difference in a current road grade and the approaching road grade.

3. The method of claim 2 further including adjusting an active rear view area of a rear facing vision system of the vehicle when the vehicle is approaching a change in road grade.

4. The method of claim 3 wherein adjusting the active rear view area includes, adjusting the active rear view area by $RCAA=(\alpha-\beta)/\alpha$ where RCAA is the rear active viewing area, $\alpha$ is the angle from a vision sensor of the rear facing vision system to ground and $\beta$ is the difference between the current road surface and the approaching road grade where $\beta$ is greater than or equal to zero and when the vehicle is traveling in reverse uphill, adjusting the rear active viewing area by $RCAA=(\alpha+\beta)/\alpha$ where $\beta$ is less than zero.

5. A vehicle having a collision avoidance system with false alert prevention when the vehicle is in reverse, comprising:
the collision avoidance system having an electronic control unit coupled to upper and lower rear facing obstruction sensors of the vehicle, a rear facing vision system of the vehicle and to a display in the vehicle; and
the electronic control unit configured to reduce a sensitivity to an object of the lower rear facing obstruction sensor when the vehicle is approaching a positive road grade change to reduce a distance at which the lower rear facing obstruction sensor senses the object.

6. The vehicle of claim 5 wherein the electronic control unit is configured to reduce the sensitivity of the lower rear facing obstruction sensor based upon a magnitude of the positive road grade change.

7. The vehicle of claim 6 wherein the electronic control unit is configured to adjust an active rear view area of a rear facing vision system of the vehicle when the vehicle is approaching a change in road grade.

8. The vehicle of claim 7 wherein the electronic control unit is configured to adjust the active rear view when a rear of the vehicle is facing downhill on the current road surface by $RCAA=(\alpha-\beta)/\alpha$ where RCAA is the rear active viewing area, $\alpha$ is the angle from a vision sensor of the rear facing vision system to ground and $\beta$ is a magnitude of the change in road grade where $\beta$ is greater than or equal to zero, and when the rear of the vehicle is facing uphill on the current road surface road adjusting the rear active viewing area by $RCAA=(\alpha+\beta)/\alpha$ where $\beta$ is less than zero.

* * * * *